United States Patent [19]

Brüssel

[11] Patent Number: 5,044,918
[45] Date of Patent: Sep. 3, 1991

[54] APPARATUS FOR SECURELY POSITIONING A FIBER-REINFORCED PLASTIC MASS IN A PRESS

[75] Inventor: Richard Brüssel, Sulzfeld, Fed. Rep. of Germany

[73] Assignee: Krupp Maschinentechnik Gesellschaft mit beschränkter Haftung, Essen, Fed. Rep. of Germany

[21] Appl. No.: 450,260

[22] Filed: Dec. 13, 1989

[30] Foreign Application Priority Data

Dec. 19, 1988 [DE] Fed. Rep. of Germany ....... 3842660

[51] Int. Cl.[5] .......................................... B29C 43/00
[52] U.S. Cl. .................................. 425/397; 425/400; 425/422; 425/444
[58] Field of Search ............... 425/394, 397, 398, 399, 425/400, 422, 444

[56] References Cited

U.S. PATENT DOCUMENTS

| | | | |
|---|---|---|---|
| 2,169,798 | 8/1939 | Haberstump et al. | 425/394 |
| 2,601,701 | 7/1952 | Sayre | 425/394 |
| 3,597,800 | 8/1971 | Silverman | 425/398 |
| 3,672,807 | 6/1972 | Genz | 425/422 |
| 3,947,207 | 3/1976 | Magidson et al. | 425/398 |
| 3,963,402 | 6/1976 | Berta | 425/398 |
| 4,555,086 | 11/1985 | Kiyomoto | 425/444 |
| 4,576,560 | 3/1986 | Herman | 425/103 |
| 4,610,619 | 9/1986 | Lesley | 425/394 |
| 4,775,312 | 10/1988 | Werz et al. | 425/400 |
| 4,844,852 | 7/1989 | Keyser et al. | 425/397 |
| 4,959,004 | 9/1990 | Nowakowski | 425/397 |

FOREIGN PATENT DOCUMENTS 63-172619  7/1988  Japan .................................. 425/394

Primary Examiner—Jay H. Woo
Assistant Examiner—C. Scott Bushey
Attorney, Agent, or Firm—Spencer & Frank

[57] ABSTRACT

An apparatus for use in a compression molding machine to secure the position of a mass of hardenable plastic compound from which a compression molded object can be produced by upper and lower mold halves which are driven so as to be movable relative to one another. In order to prevent undesirable displacement of the plastic compound mass during closing of the mold, the apparatus includes holding pins at the lower mold half. The holding pins project beyond the mold surface of the lower mold half during charging and also during part of the compression molding process. The height of the holding pins relative to the mold surface is dimensioned to be less than the thickness of the plastic compound mass in the region of the pins.

5 Claims, 2 Drawing Sheets

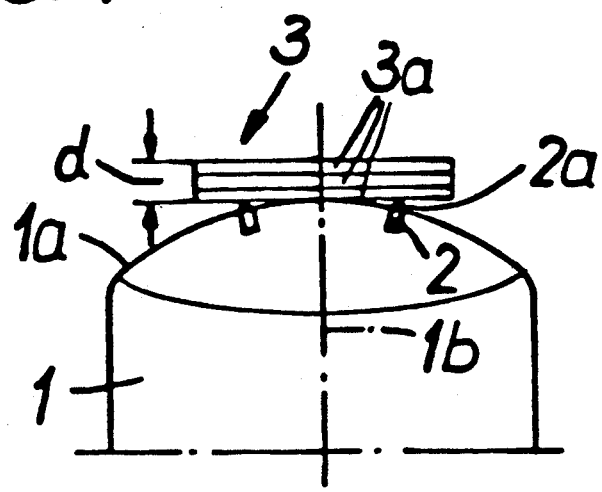
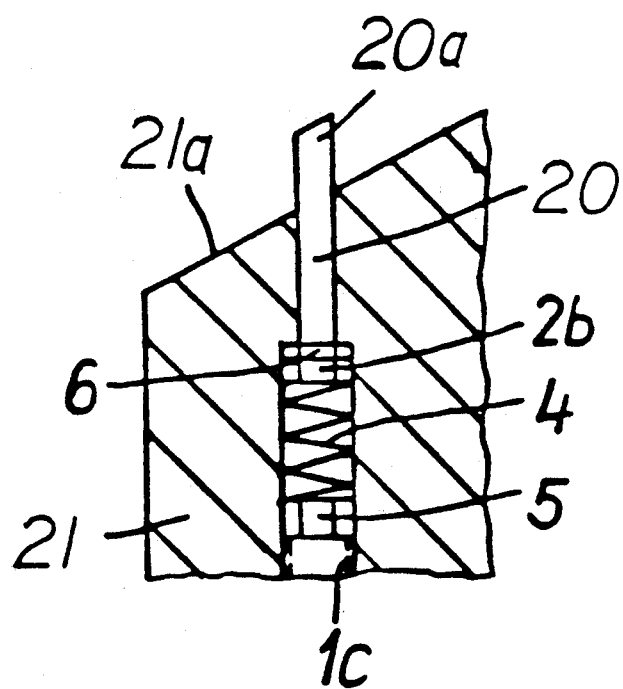

APPARATUS FOR SECURELY POSITIONING A FIBER-REINFORCED PLASTIC MASS IN A PRESS

CROSS REFERENCE TO RELATED APPLICATION

This application claims the priority of application Ser. No. P 38 42 660.9, filed Dec. 19, 1988 in the Federal Republic of Germany, the subject matter of which is incorporated herein by reference.

BACKGROUND OF THE INVENTION

The present invention relates to an apparatus for securely positioning a mass of hardenable plastic compound in a compression molding machine having upper and lower mold halves, the mold halves being driven so as to be movable relative to one another in order to form the mass into a compression molded component.

To produce a compression molded object from a hardenable plastic compound, particularly a SMC (sheet molding compound) resin mat, the mass of starting material to be processed is typically provided in the form of a layer or in the form of a press packet which includes a plurality of superposed layers. The layer or press packet is placed onto the lower mold half (referred to as the male mold) of an open press and, in order to secure its position, the layer or press packet may be pressed on or deformed by hand.

This type of positioning lengthens the period of dwell of the starting material in the press to an undesirable extent, and moreover the starting material is often displaced or slides off anyway. The most substantial automatization of the pressing process desired for economic reasons excludes the above-mentioned type of position securing.

SUMMARY OF THE INVENTION

It is an object of the present invention to provide an apparatus for securing the position of hardenable plastic compounds (particularly SMC resin mats) in a press so that, even when compression molded components having complicated shapes are produced, the starting material will not be displaced or slide off during the closing of the compression molding machine. A related object is to achieve the first object with an apparatus which is configured in such a way that the time required for performing the process steps within the compression molding machine is not extended, if possible, and in such a way that damage to the press is excluded even in connection with switching errors.

These objects can be attained by providing an apparatus in a compression molding machine to secure the position of a hardenable plastic compound mass from which a compression molded object can be produced by means of a machine equipped with upper and a lower mold halves which are driven so as to be movable relative to one another, the apparatus being characterized in that the lower mold half, on its mold surface facing the upper mold half, is provided with holding pins which project beyond the mold surface at least during charging and also during part of the pressing process, with the height of said holding pins relative to the mold surface being less than the thickness of the plastic compound mass in the region of the pins.

The basic idea of the invention is thus to equip the lower mold half with holding pins on its mold surface and to configure these pins in such a way that they retain the starting material to be shaped without interfering with the pressing process effected by the mutual approach of the upper and lower mold halves. The term "holding pins" will be understood to mean any type of projection which projects at least temporarily beyond the mold surface of the lower mold half and which forms a releasable connection with the starting material (for example by hooking into it), thereby preventing a change in position with respect to the lower mold half without the action of any special external force.

In its simplest embodiment, the apparatus is composed of holding pins which are immovable relative to the lower mold half and whose height relative to the mold side is less than the thickness of the plastic compound in the respective region. The arrangement and configuration of these immovable holding pins is such that, even with the closest approach between the lower and the upper mold halves, they are unable to come in contact with the latter.

In a different embodiment of the present invention, the holding pins are arranged to be movable with respect to the lower mold half in the sense of being adjustable in height. The adjustment in height may be effected by way of a lifting mechanism associated with the holding pins, or the pins may be moved along under the influence of an external force and thereby change their height position relative to the lower mold half. Automatic adaptation of the height of the holding pins to the process phases taking place in the region of the press can be brought about by resiliently urging the holding pins against the plastic compound. This can be accomplished by providing a support, whose tensioning force is preferably adjustable, in the form of mechanical, pneumatic, or hydraulic means (in the case of the latter, with the use of a pressure reservoir).

The advantage of a resilient support is that the height of the holding pin is automatically changed during the pressing process as soon as the pressure force transmitted by way of the plastic compound becomes greater than the tensioning force acting on the holding pins.

The present invention can also be configured in such a way that the height of the holding pins with respect to the lower mold half is variable by means of a lifting mechanism. The lifting mechanism may include, for example, a cylinder assembly, and possibly the lifting mechanism may be connected in such a way that the height of the holding pins is variable as a function of the position of the upper mold half relative to the lower mold half. After the upper mold half has approached the lower mold half to a given degree in order to initiate the compression molding process, the height of the holding pins may be changed in adaptation to the continuing mutal approach between the upper and lower mold halves until the holding pins finally no longer project beyond the lower mold half, or at most project only slightly. Upon completion of the compression molding process, the lifting mechanism may advantageously be utilized to raise the holding pins so as to permit ejection of the molded object. The raising of the holding pins assumes that the press is either opened simultaneously, by moving the upper and lower mold halves apart, or that the press has already been opened.

Preferably, each holding pin is fastened to a pin carrier that is mounted so as to be adjustable in height and whose position relative to the lower mold half can be changed.

Each pin carrier may be provided with press rams on the side facing the upper mold half. These press rams are adjustable in height and, after being brought into contact with the upper mold half, can be carried along it. The advantage of this embodiment is that the pin carrier is carried along in adaptation to the movement of the upper mold half as soon as the press ram has come in contact with the upper mold half. Together with the approach of the upper mold half to the lower mold half, the height of the holding pins relative to the mold surface of the lower mold half continues to decrease. Advisably, the pin carrier is here supported by way of a lifting mechanism—particularly in the form of several parallel-connected cylinder assemblies—adjacent the lower mold half. On one hand, the pin carrier can be raised under the influence of the lifting mechanism and on the other hand, the lifting mechanism can be configured (for example, by using suitable valves) so that the holding force emanating from it is less than the closing force exerted on the press rams by the upper mold half.

At their sides facing the press, the press rams may be additionally equipped with spring units whose spring force is greater than the holding force exerted by the lifting mechanism in the direction toward the upper mold half. Thus, in the course of the closing movement, as soon as the upper mold half comes to lie against the spring units of the press rams, the pin carrier is initially lowered against the holding force of the lifting mechanism. Only after the lifting mechanism has reached its lower end position does the upper mold half, with the pin carrier not moving, continue its downward movement against the force of the spring units in the direction toward the lower mold half.

The advantage of this embodiment is that the tips of the holding pins have already moved into the lower mold half before the pressing process is completed. Preferably, the holding pins are dimensioned relative to the play of movement of the pin carrier so that their tips lie several millimeters within the lower mold half before the spring units of the press rams become effective, once the lifting mechanism has moved to its lower end position.

It is quite possible to configure the spring units, as well as the lifting mechanism, as cylinder assemblies equipped with suitable pressure limiting valves. In a particularly simple embodiment of the present invention, the spring units are cylinders which, through the intermediary of springs, are displaceable along the press rams.

The present invention may also be configured in such a way that each pin carrier is supported, in a manner that makes it adjustable in height, by a height-adjustable transverse ejector rod. In this way, the pin carrier can be moved relative to the lower mold half independently of the transverse ejector rod. The holding pins can also be used as ejector pins for raising the compression molding object.

BRIEF DESCRIPTION OF THE DRAWINGS

FIG. 1 is a front view schematically illustrating the equipment of the lower mold half of a molding press equipped with immovable holding pins.

FIG. 2 is a vertical sectional view which schematically illustrates part of another embodiment, and shows the lower mold half of a compression molding machine with a holding pin resiliently supported therein.

DESCRIPTION OF THE PREFERRED EMBODIMENTS

Figure 3:
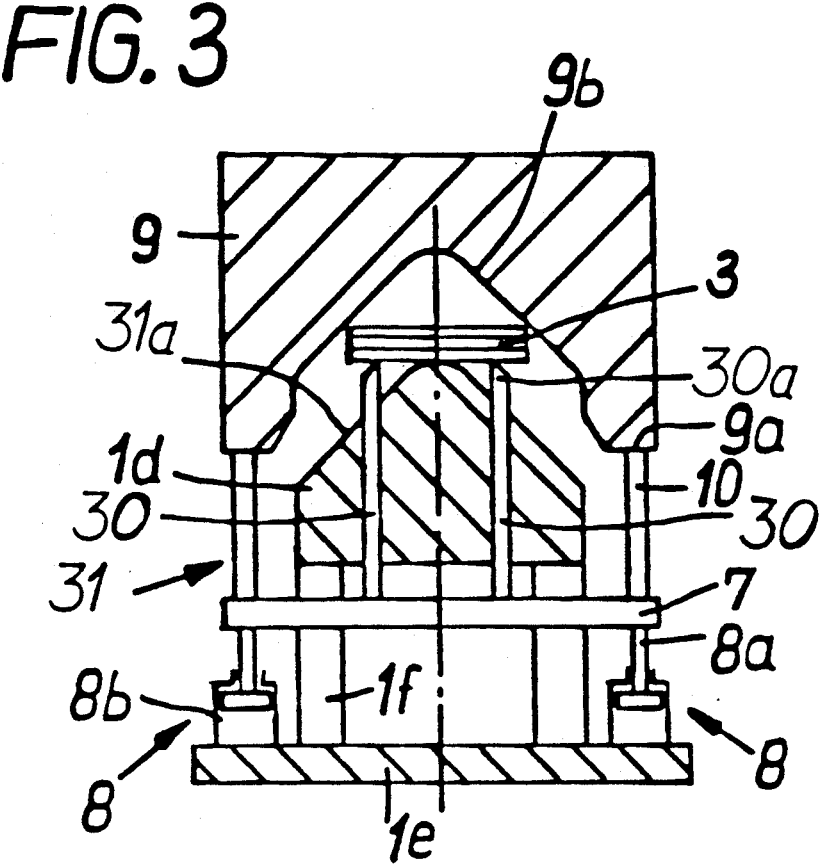
FIG. 3 is a vertical sectional view schematically illustrating a further embodiment, and shows a compression molding machine with a pin carrier which is movable relative to the lower mold half.

In its simplest embodiment, as shown schematically in FIG. 1, the position securing apparatus of the present invention is composed of holding pins 2 which are immovably fastened to the upwardly oriented mold surface $1a$ of the lower mold half 1 of a compression molding machine. In this application the term "mold surface" refers to a surface which will come into contact with the plastic compound that is to be molded. The holding pins 2 are disposed symmetrically to the center plane $1b$ of the lower mold half. Several further holding pins 2 are placed one behind the other in rows on both sides of center plane 2, the rows being perpendicular to the plane of the drawing. The height of the pin tips $2a$ projecting beyond mold surface $1a$ is less than the thickness d of the press packet 3 to be processed. The press packet 3 is composed of several superposed sticky SMC resin mat sections $3a$.

Due to being supported by the pin tips $2a$, undesired displacement of press packet 3 relative to lower mold half 1 is substantially impossible even before initiation of the pressing process begins. The indentations formed in the molded object during the pressing process, under the influence of holding pins 2, are not annoying in most cases. The dimensions of the indentations can be limited to the degree absolutely necessary by selecting suitable dimensions for pin tips $2a$, which in the illustrated embodiment are oriented approximately perpendicular to mold surface $1a$.

In the embodiment shown in FIG. 2, a holding pin 20 is guided in the lower mold half 21 so as to be adjustable in height. Pin 20 is resiliently supported at the lower mold half by way of a pre-tensioned coil spring 4 and a threaded plate 5. The area of play for holding pin 20 in the direction toward mold surface $21a$ is defined by a stop ring 6 fastened at the underside $2b$ of the pin. The pre-tension of coil spring 4 can be set by rotating threaded plate 5 in a threaded bore $1c$ of the lower mold half. The advantage of the embodiment of FIG. 2 is that holding pin 20, which lies against the press packet (not shown) under the influence of its pre-tension (see in this connection FIG. 1), is able to perform a retracting movement in the direction toward lower mold half 21 as soon as the force exerted via the press packet in the direction toward the lower mold half is sufficiently large.

Of course, instead of a mechanical spring 4, a pneumatically or hydraulically active biassing mechanism can be employed.

As is shown in FIG. 2, the tip $20a$ of pin 2 slopes in a manner adapted to mold surface $21a$. That is, when pin 20 is in its retracted position the upper surface of pin tip $20a$ will be even with and conform to the surrounding region of mold surface $21a$.

In the embodiment according to FIG. 3, holding pins 30 are also spaced one behind the other in rows perpendicular to the plane of the drawing. Pins 30 pass through the head section $1d$ of lower mold half 31 and are fastened to a pin carrier 7 below the head section $1d$. Pin carrier 7 is supported by way of a lifting mechanism in the form of two cylinder assemblies 8 at a base plate 1e of lower mold half 31, so that the height of pin carrier 7 is adjustable. By way of supports 1f, base plate 1e is connected to head member 1d. The piston rods 8a of the cylinder assemblies 8 are fastened to the underside of pin carrier 7, and the associated cylinder housings 8b are fixed to base plate 1e.

On the upper side facing the upper mold half 9, pin carrier 7 is equipped with press rams 10 which are advisably adjustable in length (for example, by way of a threaded connection equipped with a securing nut, not shown). Press rams 10 make it possible to positively return pin carrier 7 and the holding pins 30 fastened to it downwardly under the influence of the frontal faces 9a of upper mold half 9.

During operation, mold halves 31 and 9 are moved relative to one another so that they approach one another to the extent that the frontal faces 9a of upper mold half 9 are supported against press rams 10, and thereafter pin carrier 7 is moved toward base plate 1e against the force of cylinder assemblies 8 as the approaching movement continues. As a result pin tips 30a are retracted toward mold surface 31a and accordingly form insignificant indentations at most in press packet 3. Cylinder assemblies 8 are equipped with switchable valves (not shown) in such a manner that they are able to generate only a relatively slight holding force (i.e., the upward force exerted by cylinder assemblies 8 to urge the holding pins toward upper mold half 9) during the mutual approach of mold halves 31 and 9.

Press rams 10 preferably have a length which is selected to ensure that frontal faces 9a of upper mold half 9 do not come in contact with the press rams 10 until the mold surface 9b of mold 9 has exerted a slight pressing force on the press packet 3.

Figure 4:
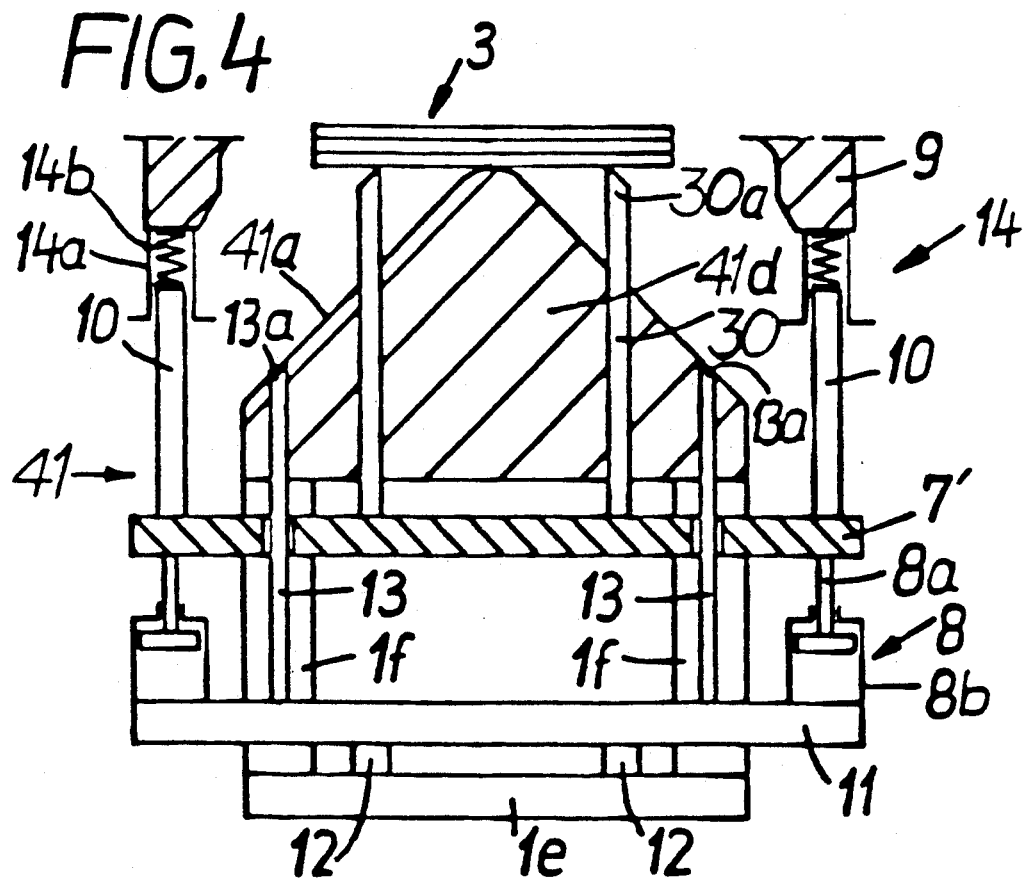
FIG. 4 is a vertical sectional view schematically illustrating an additional embodiment, and shows the lower mold half of a compression molding machine equipped with a height adjustable transverse ejector rod and a pin carrier adjustable in height relative to the transverse ejector rod.

In the embodiment of FIG. 4, pin carrier 7' is supported by way of cylinder assemblies 8 on a transverse ejector rod 11. A height adjustment mechanism, in the form of two cylinder assemblies 12, is provided to adjust the height of ejector rod 11 relative to base plate 1e. The upper face of transverse ejector rod 11 is equipped with ejector pins 13 which—similar to holding pins 30—movably extend through head member 41d of lower mold half 41. The tips 30a of pins 30 slope in a manner adapted to mold surface 41a. The tips 13a of ejector pins 13 are flush with mold surface 41a when the elements are positioned as shown.

In the embodiment of FIG. 4, press rams 10 are equipped with spring units 14 at their sides facing upper mold half 9. Spring units 14 are composed of cylinders 14a supported displaceably at the press rams 10 through the intermediary of springs 14b. Springs 14b are configured in such a manner that their spring force is greater than the holding force exerted by cylinder assemblies 8 in the direction toward upper mold half 9.

As soon as upper mold half 9 is supported at cylinders 14a in the course of the closing movement, pin carrier 7' is initially moved downwardly until cylinder assemblies 8 have reached their lower end position. Only thereafter will upper mold half 9 continue its closing movement, against the action of springs 14b, until the molding process is completed.

The embodiment of FIG. 4 permits pin carrier 7' to be moved independently of the height position of transverse ejector rod 11 and, by simultaneously extending cylinder assemblies 8 and 12, holding pins 30 can be used also as ejector pins for the resulting compression molded object.

The advantage realized by the present invention is that the plastic compound to be processed can be secured against displacement or sliding off by supporting it on the holding pins at least until after the compression molding process has begun. This prevents an undesirable change in the position of the plastic compound relative to the lower mold half. Moreover, by equipping the press with height adjustable holding pins the creation of annoying indentations in the compression molded object can be substantially avoided.

It will be understood that the above description of the present invention is susceptible to various modifications, changes, and adaptations, and the same are intended to be comprehended within the meaning and range of equivalents of the appended claims.

What I claim is:

1. An apparatus, for use in a compression molding machine having an upper mold half and a lower mold half with a mold surface that faces the upper mold half and having means for moving the mold halves relative to one another so as to form a compression molded object from a mass of hardenable plastic compound that has been placed between the mold halves, to secure the position of the mass of hardenable plastic compound in the compression molding machine, said apparatus comprising:

a plurality of holding pins; and means for mounting the pins so that the pins project beyond the mold surface of the lower mold half at least when the mass is being placed between the mold halves and during part of the time that the mold halves are being moved relative to one another, the height of the holding pins relative to the mold surface of the lower mold half, when the mold halves are closest together, being less than the thickness of the mass adjacent the pins, wherein the pins are movable relative to the lower mold half and the means for mounting includes means for adjusting the height of the pins relative to the mold surface of the lower mold half, wherein the means for adjusting includes a pin carrier to which the pins are attached, the pin carrier having a side which faces the upper mold half, and means for varying the position of the pin carrier relative to the lower mold half, and wherein the means for varying the position includes press rams having ends facing the upper mold half, the press rams being adjustable in length and being disposed on the side of the pin carrier facing the upper mold half, the press rams being carried along by the upper mold half once they have been brought into contact with the upper mold half, lifting mechanism means for exerting a holding force on the pin carrier and in the direction of the upper mold half, and spring units disposed at the ends of the press rams facing the upper mold half, the spring units having a spring force which is greater than the holding force exerted by the lifting mechanism means in the direction toward the upper mold half.

2. The apparatus of claim 1, wherein each spring unit comprises a cylinder and a spring, the cylinder being displaceably guided on the respective press ram via the spring.

3. An apparatus, for use in a compression molding machine having an upper mold half and a lower mold half with a mold surface that faces the upper mold half and having means for moving the mold halves relative to one another so as to form a compression molded object from a mass of hardenable plastic compound that has been placed between the mold halves, to secure the position of the mass of hardenable plastic compound in the compression molding machine, said apparatus comprising:

a plurality of holding pins; and means for mounting the pins so that the pins project beyond the mold surface of the lower mold half at least when the mass is being placed between the mold halves and during part of the time that the mold halves are being moved relative to one another, the height of the holding pins relative to the mold surface of the lower mold half, when the mold halves are closest together, being less than the thickness of the mass adjacent the pins, wherein the pins are movable relative to the lower mold half and the means for mounting includes means for adjusting the height of the pins relative to the mold surface of the lower mold half, wherein the means for adjusting includes a pin carrier to which the pins are attached, and means for varying the position of the pin carrier relative to the lower mold half, and wherein the means for varying includes a transverse ejector rod, and means for controlling the height of the pin carrier with respect to the transverse ejector rod.

4. The apparatus of claim 3, wherein the means for varying the position of the pin carrier further comprises a lifting mechanism.

5. The apparatus of claim 3, wherein the means for varying the position of the pin carrier further comprises means for varying the height of the pin carrier as a function of the position of the upper mold half relative to the lower mold half.

* * * * *